United States Patent [19]
Gzym et al.

[11] Patent Number: 5,717,884
[45] Date of Patent: Feb. 10, 1998

[54] METHOD AND APPARATUS FOR CACHE MANAGEMENT

[75] Inventors: Michael Alan Gzym, Longmont; David Frank Jacyna, Boulder; Stephen Sidney Selkirk, Lafayette, all of Colo.

[73] Assignee: Storage Technology Corporation, Louisville, Colo.

[21] Appl. No.: 594,625

[22] Filed: Feb. 2, 1996

[51] Int. Cl.[6] ................................. G06F 12/08
[52] U.S. Cl. ............... 395/416; 395/445; 395/441; 395/440; 364/DIG. 1
[58] Field of Search .................. 395/800, 416, 395/441; 369/30

[56] References Cited

U.S. PATENT DOCUMENTS

| | | | |
|---|---|---|---|
| 5,113,523 | 5/1992 | Colley et al. | 395/800 |
| 5,341,483 | 8/1994 | Frank et al. | 395/416 |
| 5,386,516 | 1/1995 | Monahan et al. | 369/30 |
| 5,410,667 | 4/1995 | Belsan et al. | 395/441 |
| 5,581,724 | 12/1996 | Belsan et al. | 395/441 |

*Primary Examiner*—Tod R. Swann
*Assistant Examiner*—David C. Langjahr
*Attorney, Agent, or Firm*—Duft, Graziano & Forest, P.C.

[57] ABSTRACT

The cache memory is divided into a plurality of slots, each of which is used to store data files that are staged from the storage devices for transmission to the processor or received from the processor for writing on the storage devices. The management of the plurality of slots is accomplished by the use of at least two sets of lists: global lists and local lists. These lists function to respectively manage the entirety of the cache memory and the slots, either on an individual slot basis or on a virtual device basis. These two sets of lists therefore operate on a substantially orthogonal basis, while also operating cooperatively, to efficiently manage the writing of data into and out of the cache memory.

23 Claims, 8 Drawing Sheets

|  | GLOBAL LISTS | | | | | | |
|---|---|---|---|---|---|---|---|
|  | USAGE | OFFLIST | PINNED | SSD | SIDEFILES | OFFLINE | NOT INSTALLED |
| USAGE | X | | | | | | |
| OFFLIST | X | | | | | X | X |
| CFW | X | | | | | | |
| DFW | X | | | | | | |
| DESTAGE | X | X | X | | | | |
| PINNED | | | X | | | | |
| SSD | | | | X | | | |
| TOTAL | X | X | X | X | | | |

LOCAL LISTS

FIG. 2

METHOD AND APPARATUS FOR CACHE MANAGEMENT

FIELD OF THE INVENTION

This invention relates to cached data storage subsystems and, in particular, to a method and apparatus for managing the cache memory in a data storage subsystem that contains a plurality of backend data storage devices.

PROBLEM

It is a problem in cached data storage subsystems to efficiently manage the cache memory which is used to stage and destage the data files for the backend data storage devices. This cache memory management problem is exacerbated by the need to concurrently serve a plurality of backend data storage devices, which are interconnected with the cache memory via a plurality of storage controllers.

Prior art cache memory management systems do not manage the memory allocation and operation on a virtual device basis. These existing cache memory management systems view the cache memory as a unitary structure and do not consider the various uses that the data storage subsystem can make of the memory slots of the cache memory. In particular, the host processors can write data files to the backend data storage devices pursuant to a number of algorithms, including DASD fast write, cache fast write, cache buffered data write. In addition, the cache memory requires management as a system resource, wherein a portion of the cache memory address space may not be equipped and/or segments of the cache memory may be unavailable for the reading and writing of data for various reasons. Existing cache memory management systems do not address the multitude of issues in an organized manner, thereby reducing the efficiency of the cache management.

SOLUTION

The above described problems are solved and a technical advance achieved by the method and apparatus for cache management of the present invention. The preferred embodiment of the invention is disclosed as a virtual memory data storage subsystem which is connected to at least one processor for the storage and retrieval of data files for the processor. The data storage subsystem comprises a plurality of physical devices interconnected with a cache memory via a lesser plurality of storage controllers, such that each storage controller interfaces at least one data storage device to the cache memory. The physical devices may be configured as virtual devices, which can differ in characteristics from the physical devices on which they are implemented.

The cache memory is divided into a plurality of slots, each of which is used to store data files that are staged from the storage devices for transmission to the processor or received from the processor for writing on the storage devices. The management of the plurality of slots is accomplished by the use of at least two sets of lists: global lists and local lists. These lists function to respectively manage the entirety of the cache memory and the individual slots, on the basis of an individual slot's relation to either the entire cache memory or to the cache memory allocated to the virtual devices. These two sets of lists therefore operate on a substantially orthogonal basis, while also operating cooperatively, to efficiently manage the writing of data into and out of the cache memory.

By viewing the cache management problem as a plurality of interrelated yet unique perspectives, the method and apparatus of the cache management system of the present invention more efficiently manages the operation of the cache memory and can address a multitude of issues and applications in a simplified manner. The various types of data write operations are managed on an individual class of write operation basis, yet all cache memory writes are managed as a whole. Similarly, the various cache slot preempting operations are managed concurrently with the cache memory write operations to ensure that all slots of the cache memory are monitored and managed.

BRIEF DESCRIPTION OF THE DRAWING

FIG. 2 illustrates in block diagram form the conceptual implementation of a two dimensional implementation of the sets of cache management lists;

DETAILED DESCRIPTION

Figure 1:
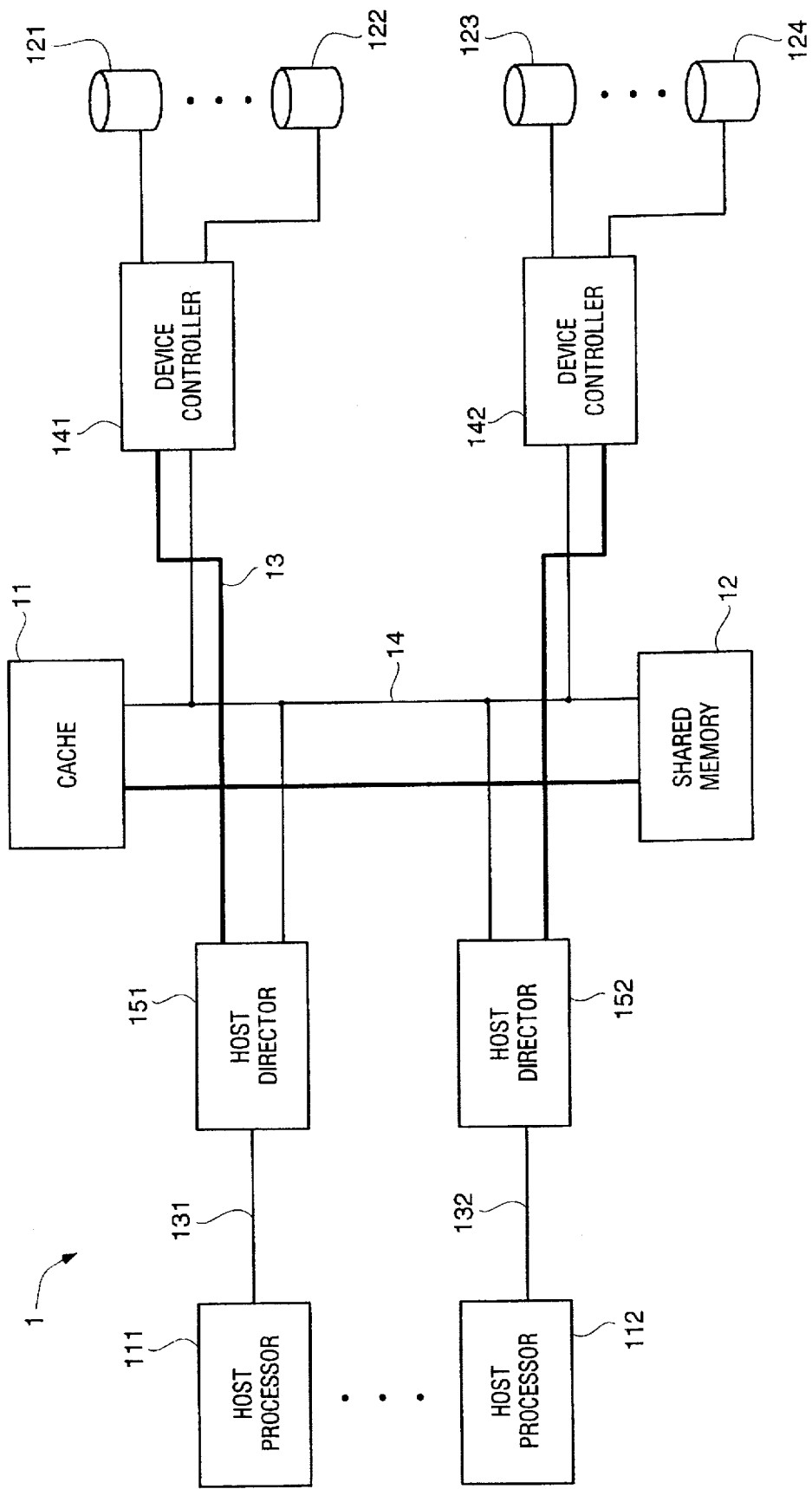
FIG. 1 illustrates in block diagram form the overall architecture of the preferred embodiment of the virtual memory data storage subsystem of the present invention.

FIG. 1 illustrates in block diagram form the overall architecture of the preferred embodiment of the virtual memory data storage subsystem of the present invention. The data storage subsystem 1 comprises an on-line data storage element that typically serves a plurality of host processors 111, 112. The data storage subsystem 1 is connected to the plurality of host processors 111, 112 via data channels 131, 132 and functions to exchange data files between the host processors 111, 112 and the backend data storage devices 121–124 contained within the data storage subsystem 1. The data storage subsystem 1 includes host directors 151, 152 that serve to interconnect the data storage devices 121–124 and their associated storage controls 141, 142 with the data channels 131, 132 that interconnect the host processors 111, 112 with the data storage subsystem 1. The data storage devices 121–124 illustrated in the preferred embodiment of the invention comprise disk drives which contain a plurality of tracks of data storage and which are managed as virtual devices, such that the physical characteristics of the physical devices are not evident to the host processors 111, 112.

The performance of the data storage subsystem 1 is enhanced by the use of both a cache memory 11, and backend data staging and destaging processes. Data received from the host processors 111, 112 by the host directors 151, 152 is stored in the cache memory 11 via data bus 13 in the form of new data or modifications to data already stored in the backend virtual data storage devices. As determined by cache replacement algorithms, such as Least Recently Used (LRU), data stored in the cache memory 11 and scheduled for writing to the backend data storage devices 121–124 is written onto the tracks of the data storage devices. With respect to data file transfer operations, all data transfers go through cache memory 11. The front end or channel operations are completely independent of the backend or device transfer operations. Because of this front end/back end separation, the data storage subsystem 1 is liberated from the channel timing dependencies. The data storage subsystem 1 is free to dedicate its processing resources to increasing performance through more intelligent scheduling and data transfer control.

DASD Fast Write Operations

DASD fast write is a well known data storage subsystem feature which improves the operation of the data storage subsystem because immediate access to the storage devices is not required to implement the data file write operation. A DASD fast write operation stores the received data file in the cache memory 11. Immediate access to the backend data storage devices 121–124 is not required to complete the write operation since the data storage subsystem 1 returns channel end and device end status signals to the host processor 111 at the end of the data file write to the cache memory 11. The host processor 111 views these received signals as indicative of the data file being written to the backend data storage devices 121. This allows the host processor 111 to continue processing without waiting for the data to be written to the target data storage device 121 within the data storage subsystem 1. The received data files are maintained in the cache memory 11 until the data storage subsystem's write scheduling algorithm destages the data from cache memory 11 to the selected backend data storage device 121. This feature enables the data storage subsystem 1 to manage the data file write to backend data storage devices in due course on an orderly basis without disrupting the existing queued operations.

Cache Fast Write Operation

Cache fast write stores the received data in the cache memory 11. The data subsystem 1 returns the channel and device end status to the host processor 111 at the end of the data file write to the cache memory 11. The host processor 111 does not expect this data to be destaged to the physical device in the normal course of operations. This data normally is destaged to the physical device only upon a specific host command requesting destaging of data. The data may also be discarded by the host without being destaged. The data may be destaged by the subsystem if it decides this is desirable in the course of cache management, but there is no requirement for it to do so just as there is no penalty if the cache fast write data is not destaged except upon explicit host instructions. This feature enables the data storage subsystem to store host data without using backend data storage resources.

Cache Management List Types

The cache memory 11 is divided into a plurality of slots, each of which is capable of storing a predetermined amount of data. The slots are uniform in size for simplicity of cache management. The size of the slots in terms of data storage capacity, is typically selected to be some logical increment, such as a fraction of the size of a track in the backend data storage devices. Thus, typically, a number of slots comprise a single track. The size determination for the slots is a matter of design choice and is not critical for the purpose of this description.

There are a plurality of list types maintained in the data storage subsystem 1 for the management of the cache memory 11. The plurality of list types operate in substantially orthogonal yet cooperative fashion to collectively and efficiently manage the cache memory 11. Each of the types of lists addresses a different aspect of the cache memory 11 and optimizes the cache memory 11 for that aspect. Thus, in the preferred embodiment of the invention disclosed herein, there are two types of lists: global and local. The global lists function to view the cache operation on an overall cache memory 11 basis to ensure that the cache memory 11 is being optimally utilized. The local lists focus on the use of individual slots or collections of slots organized on a virtual device basis.

The slots in the cache memory 11 each contain a directory which contains two sets of forward and backward pointers for each of the two lists on which the slot may be cataloged: global and local. The slot directory also contains variables which identify the list for which the pointer values are stored. For example, a slot must be on a global list at all times, yet can only be on a single global list at a time. The slot is typically listed on a local list, on a single local list at a time, and the types of local lists can be divided by the list type as well as the logical device for which the slot is presently storing data files. When a list is a linked list, the list is terminated at each end by a NULL entry in the appropriate slot directory entry to indicate the end of the linked list.

Global Lists

The set of global lists maintains data regarding the characteristics of all of the slots in terms of the entire cache memory, thus the term "global" is used to characterize this aspect of the list viewpoint. The preferred embodiment of the invention discloses the use of seven global list types: USAGE, OFFLIST, PINNED, SSD, SIDEFILES, OFFLINE, NOTINSTALLED. There is a header maintained in the cache memory for each of these types of lists. The lists are typically linked lists, which contain pointers to the first and last slots on the linked lists and a count of the number of linked slots for each of the global lists. A slot can only be part of a single one of the linked lists, since the linked lists disclosed herein comprise slot status lists, which are mutually exclusive in nature. Thus, the sum of the counts of slots on each of the lists comprise the number of total slots in the system.

The USAGE list represents a time ordering of the active slots, indicating the last time the slot was accessed. The Least Recently Used (LRU) entry on this list is selected for reallocation when additional slots are required for use by the data storage subsystem. The last reallocated slot becomes the Most Recently Used (MRU) entry on this list once the data storage subsystem writes data into this slot. During the reallocation process, if the LRU slot selected for reallocation is found to contain data that has yet to be destaged to the backend storage devices, the slot is migrated to the OFFLIST global list where it is scheduled for destaging to the backend storage devices. Once the data contained in an OFFLIST slot is destaged, it is migrated to the LRU position of the USAGE list.

The PINNED global list comprises slots which contain data files written by the host processor, which data files cannot be written to the designated storage device for some reason. A count is also maintained to indicate the number of slots contained in the PINNED list. The SSD global list contains slots which are removed from normal cache memory operation and which are used as a solid state disk. The SIDEFILES list contains slots which are removed from normal cache memory operation and which are used as data files for concurrent copy operations. The OFFLINE list contains slots which are removed from normal cache memory operation and which are not available for use, such as defective slots or slots being used for internal operations. The NOTINSTALLED list contains slots which are not equipped, yet within the address space of the cache memory.

The collection of global lists noted above characterize the overall state of the cache memory for the major categories of cache slot usage. While there are many subcategories of slot usage that must be considered in cache management, these subcategories are appropriately the target of the local lists, since the global lists relate to overall cache memory status.

Local Lists

The set of local lists maintains data regarding the characteristics of the slots in terms of individual subsets of slots rather than the entirety of the cache memory. The preferred embodiment of the invention discloses the use of eight local list types: USAGE, OFFLIST, CFW, DFW, PINNED, SSD, DESTAGE, TOTAL. There is a header maintained in the cache memory for each of these types of lists. The lists are typically linked lists, which contain pointers to the first and last slots on the linked lists and a count of the number of linked slots for each of the local lists. A slot can only be part of a single one of the linked lists (except TOTAL which is a count of all slots), since the linked lists disclosed herein comprise slot status lists, which are mutually exclusive in nature.

The USAGE and OFFLIST local lists contain slots which contain the same data as stored on the physical device. Additionally, the USAGE list is a linked list containing the slots in a time ordering of the host access when this information is needed on a per virtual device basis. A situation where this information would be useful is when only a limited portion of the cache memory is available for use by a single virtual device. The USAGE and OFFLIST local lists are not used simultaneously for a virtual device. On the USAGE list, the Least Recently Used (LRU) entry on that list is selected for reallocation when additional slots are required for use by the data storage system for a track on that virtual device. The slot most recently accessed by the host processor becomes the Most Recently Used (MRU) entry on this list if the data in the slot is the same as that on the physical device.

The CFW local list comprises slots to which a host processor has written cache fast write data, while the DFW list comprises slots to which a host processor has written DASD fast write data or cache buffered write data. These two lists represent subsets of active data, with specific recognition being given to the unique nature of the data management required for the data files written therein.

The PINNED local list comprises slots which contain data files written by the host processor, which data files cannot be written to the designated storage device for some reason. A count is also maintained to indicate the number of slots contained in the PINNED list. The SSD global list contains slots which are removed from normal cache memory operation and which are used as a solid state disk.

The DESTAGE list contains slots which contain data written by one of the host processors for relocation to a selected data storage device. Most data files that are relocated to a backend data storage device are migrated through this list. Thus, the entries on the CFW and DFW lists are migrated to the DESTAGE list for rewriting to the data storage devices. The data file migration process is triggered by the number of host writes and/or the length of time since the last host processor data file write. Similarly, if the host processor suspends or terminates the solid state disk operation, all slots in the SSD list are migrated to the DESTAGE list for writing to the selected data storage device.

Cache Slot Lists and Directory Structure

Figure 3:
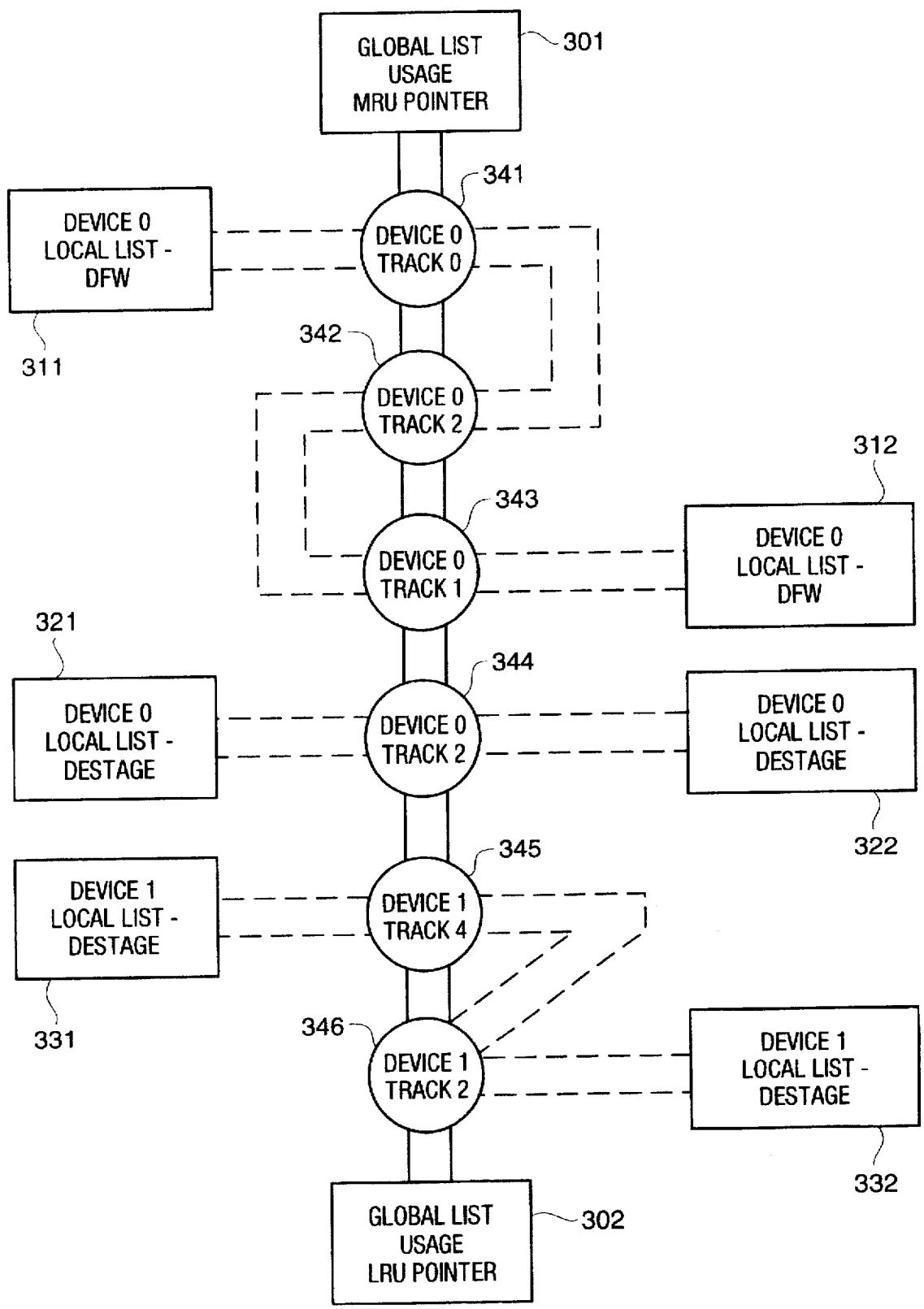
FIG. 3 illustrates in block diagram form additional details of the conceptual block diagram of FIG. 2.
Figure 8:
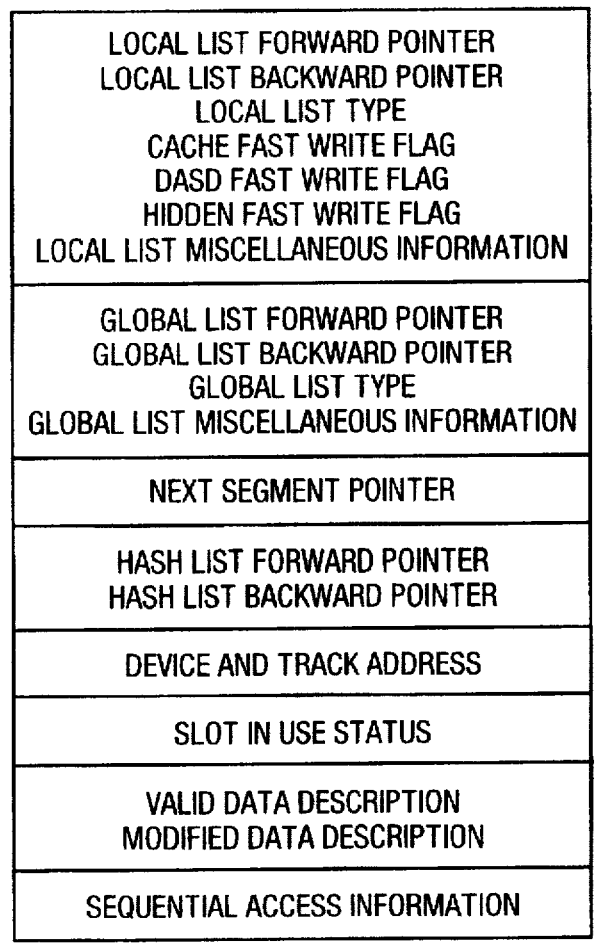
FIG. 8 illustrates an illustrative embodiment of the directory structure of a cache memory slot.

FIG. 2 illustrates in block diagram form the conceptual implementation of a two dimensional implementation of the sets of cache management lists and FIG. 3 illustrates in block diagram form additional details of the conceptual block diagram of FIG. 2. FIG. 8 illustrates an illustrative embodiment of the directory structure of a cache memory slot. Collectively, these figures provide an overall perspective on the structure of the cache management apparatus, the operation of which is described in the context of data file read and write operations below.

In FIG. 8, the slot directory is illustrated as entries in a table, which comprise data comprising pointers in both the forward and backward directions for the local and global lists. In addition, data is provided to indicate which of the local and global lists the particular slot is entered in and what other administrative information is pertinent to this slot. Furthermore, additional cache information, such as the hash list pointers are provided, along with the identity of the device and track in the backend data storage device 121–124 the data is to be stored on, or from which the slot entry was obtained.

In FIG. 2, the global and local lists are illustrated as a table with the absence of a X in the table indicating instances where a slot cannot be on certain combinations of global and local lists, since these combinations are illogical. Thus, a slot cannot be on the DESTAGE local list indicating that the data contained therein is ready to be written to a backend data storage device while also being on the NOTINSTALLED global list which indicated that there is no equipment present for this cache memory address. Thus, the intersection of the global list threads in the vertical direction and the local list threads in the horizontal direction indicate various logical combinations possible with this cache memory management implementation of seven global lists and eight local lists.

In FIG. 3, only a small number of the lists is illustrated to demonstrate the diverse perspectives taken by the list types, as well as the characteristics of the lists. In particular, the circle symbols 341–346 in the center of the diagram indicate particular instances of a device and a track. The rectangular symbols 301, 302, 311, 312, 321, 322, 331, and 332 surrounding the device and track instances represent the end points of various global and local lists. The dotted lines interconnecting elements represent the threads of the linked local lists, while the solid lines interconnecting elements represent the threads of linked global lists. Thus, for example, the topmost linked local list comprises the DASD Fast Write (DFW) local list which comprises three elements: Device 0, Track 0 (341)–Device 0, Track 2 (342)–Device 0, Track 1 (343). The dotted lines interconnecting these three elements 341–343 represent the linked list of which these three elements are a part, with elements 311 and 312 representing the head and tail ends, respectively, of the linked list. As can be seen from this linked list, the ordering of the elements contained therein is a chronological ordering, on a virtual device basis indicative of the temporal order in which these data files were received from the host processors for DASD Fast Write to the backend data storage devices. Each virtual device has its own local list.

Similarly, the DESTAGE local list is comprised of a number of sublists, two of which are shown in FIG. 3. Each DESTAGE list is a listing of slots for a particular virtual data storage device. Thus, a first DESTAGE local list for virtual device 0 comprises head end element 321 and tail end element 322, with only a single entry (344) comprising Device 0, Track 2. The second DESTAGE local list illustrated for virtual device 1 comprises head end element 331 and tail end element 332, with two entries (345–346) comprising Device 1, Track 4 and Device 1, Track 2. Again, as can be seen for these entries, the DESTAGE local list contains entries on a temporal basis, not logical track order basis.

FIG. 3 also illustrates a global list, having head end element 301 and tail end element 302, which global list comprises the USAGE list. Thus, all the active slots are included in the USAGE list, so all of the slots indicated in the local lists of FIG. 3 are included therein. It is obvious that there are far more slots in a typical cache memory than are illustrated in FIG. 3 and not all the lists are illustrated. The small example shown simply illustrated the basic concept of the cache management system of the present invention.

Data File Read Operation

Figure 6A:
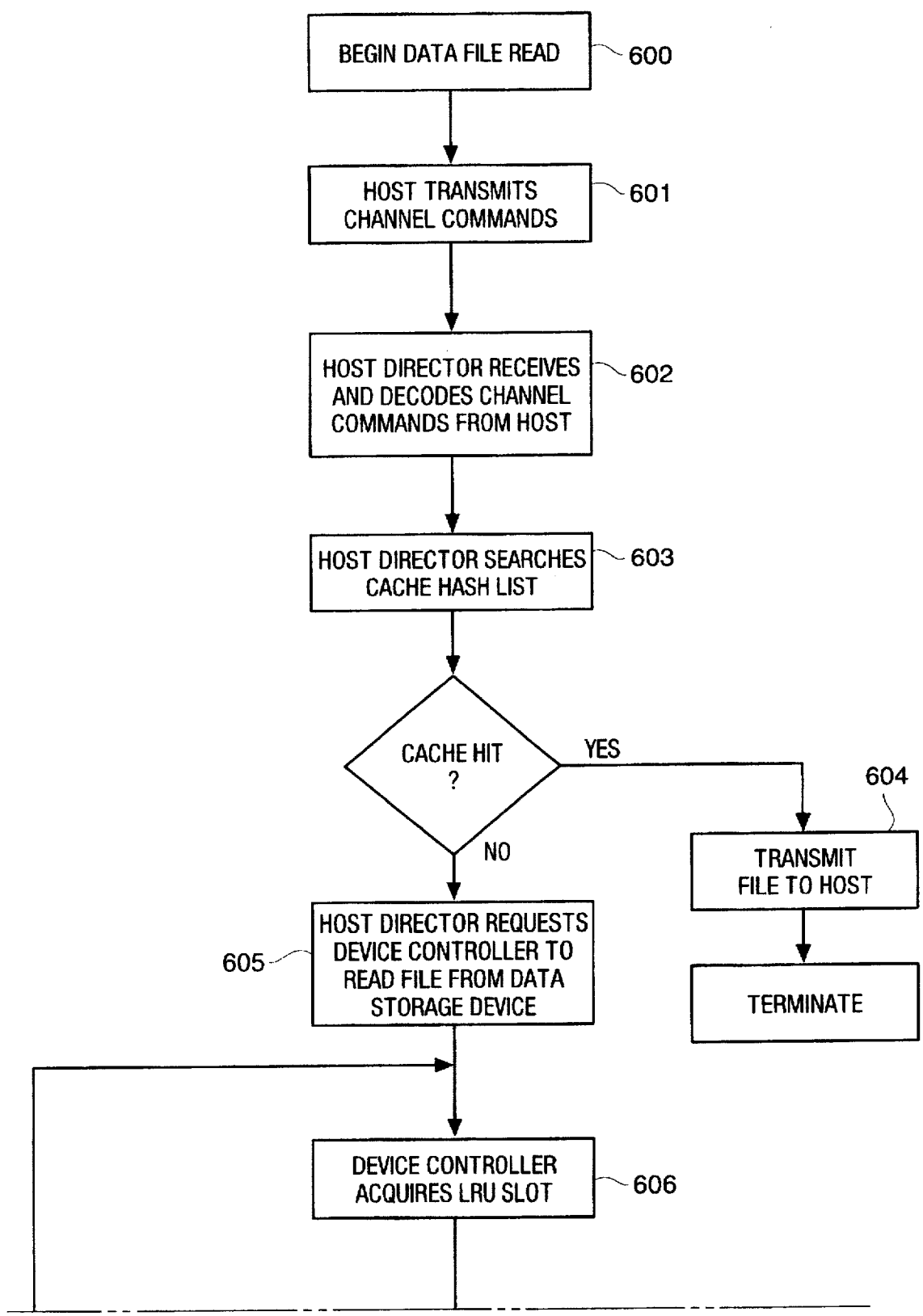
FIGS. 6A, 6B and 7 illustrate in flow diagram form the operation of the preferred embodiment of the invention for a data file stage and destage operation, respectively.
Figure 6B:
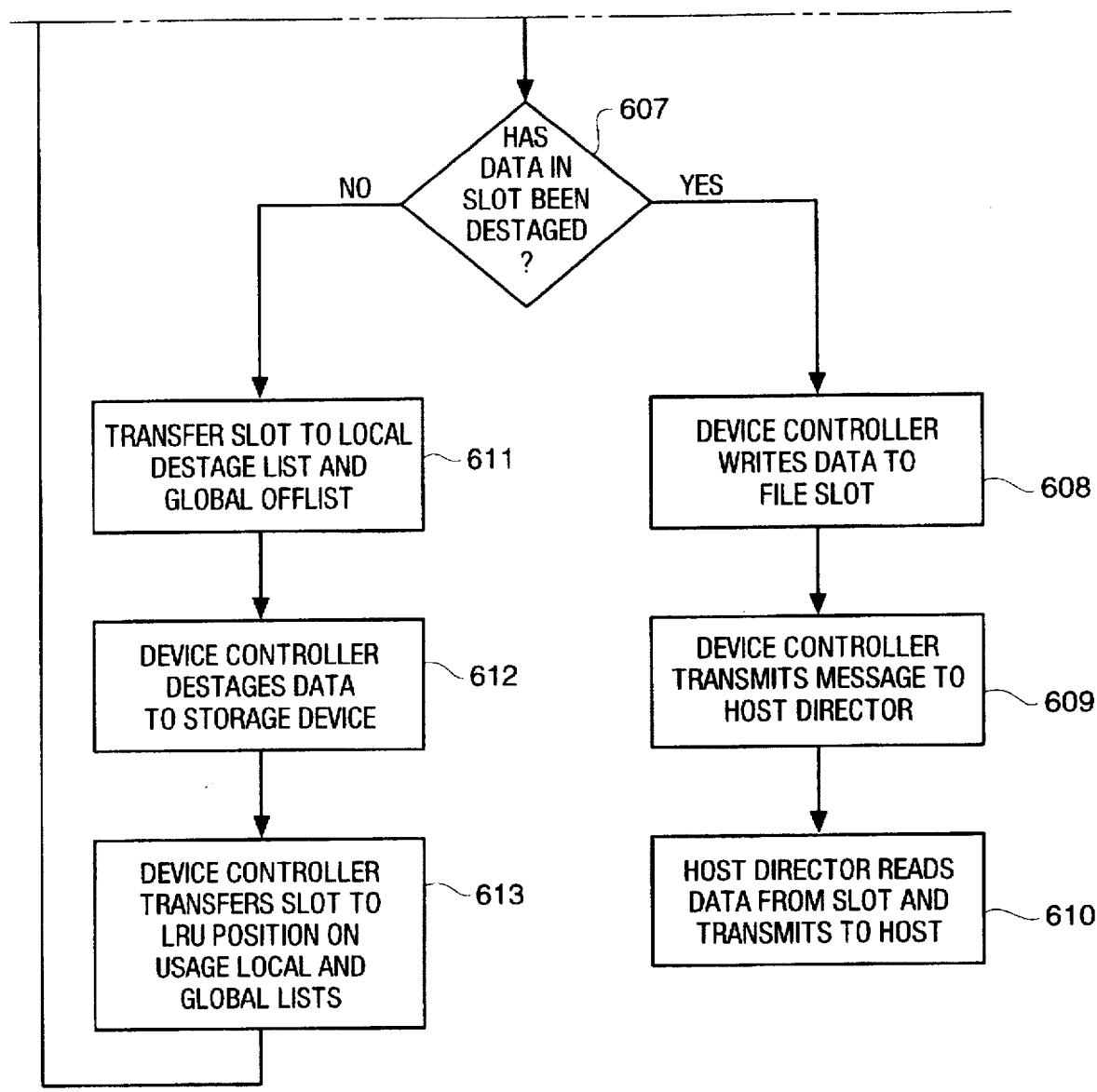

FIGS. 6A and 6B illustrate in flow diagram form the operation of the preferred embodiment of the invention illustrated in FIG. 1 for a data file read operation, also termed a data file stage operation. This flow diagram illustrates the case where the host processor 111 at step 600 requests access to a data file that is stored on a selected backend data storage device 121, but the requested data file is not also stored in cache memory 11.

The operation is initiated at step 601 where the host processor 111 transmits a series of channel commands, via an available data channel 131, to the data storage subsystem 1 to indicate that the host processor 111 requests access to an identified data file that is stored on an identified virtual device which is part of the backend data storage devices 121–124 of the data storage subsystem 1. The host director 151 of the data storage subsystem 1 receives at step 602 and decodes the received channel commands. At step 603 the host director 151 searches the cache memory hash list index to ascertain whether the requested data file is stored in cache memory 11. If the requested data file is stored in the cache memory 11 (termed a "cache hit"), at step 604 the host director 151 reads the requested data file out of the identified slot of cache memory 11 and transmits the data file to the requesting host processor 111 via a selected data channel 131 and terminates the operation. Assume for the purpose of this description that the requested data file is not stored in cache memory 11, then this constitutes a "cache miss" and the host director 151 must order a device controller 141 to stage the requested data file from the backend data storage device 121 to the cache memory 11 and thence to the requesting host processor 111 via host director 151. This is accomplished by the host director 151 transmitting control messages at step 605 via control bus 14 and shared memory 12 to the device controller 141 which is connected to the data storage device 121 on which the requested data file is stored.

The data file is retrieved by the device controller 141 in well known fashion from the identified backend data storage device 121 and written into the cache memory 11. The device controller 141 at step 606 locates an available slot of cache memory 11 by reading the LRU entry from the cache directory to identify the next available slot. If the data presently stored in the identified LRU slot has yet to be written to backend data storage device 121, as determined at step 607, the data file stored in this slot must be processed independent of the device controller 141 locating another available slot. This is accomplished by reclassifying at step 611 the selected slot to the DESTAGE local list and to the OFFLIST global list while it is scheduled for destaging to the backend data storage device 122. The device controller 141 retrieves another slot from the LRU position at step 606, and this slot is allocated to the data file stage operation. The device controller 141 writes the identified requested data file to this slot from the identified backend data storage device location at step 608. The device controller 141 also notifies the requesting host director 151, at step 609 via the shared memory 12, of the availability of the requested data file in the selected slot. The host director 151 then transmits the data file from the cache memory slot to the requesting host processor 111 over the data channel 131 at step 610. This slot remains on the USAGE global and local lists until the data contained therein is aged to the point where the slot becomes an LRU slot or is reassigned by either a host director or storage controller to one of the other cache local list types: CFW, DFW, PINNED, SSD.

The destage of a data file from the slot noted above is accomplished by reclassifying this slot to the DESTAGE local list. The device controller 141 which manages the data storage device on which this data file is to be written reviews the entries in the DESTAGE local list for this virtual device and notes the presence of the identified slot therein. The device controller 141 at step 612 retrieves the identity of the slot from the DESTAGE local list and then retrieves the data file from the identified slot and writes this data file to the backend data storage device 122 thereby freeing the slot. Once the data contained in an OFFLIST slot is destaged, the slot is migrated at step 613 to both the LRU position of the USAGE global list as well as the LRU position of the USAGE local list or the OFFLIST local list, whichever is in effect at the time.

Data File Write Operation

Figure 7:
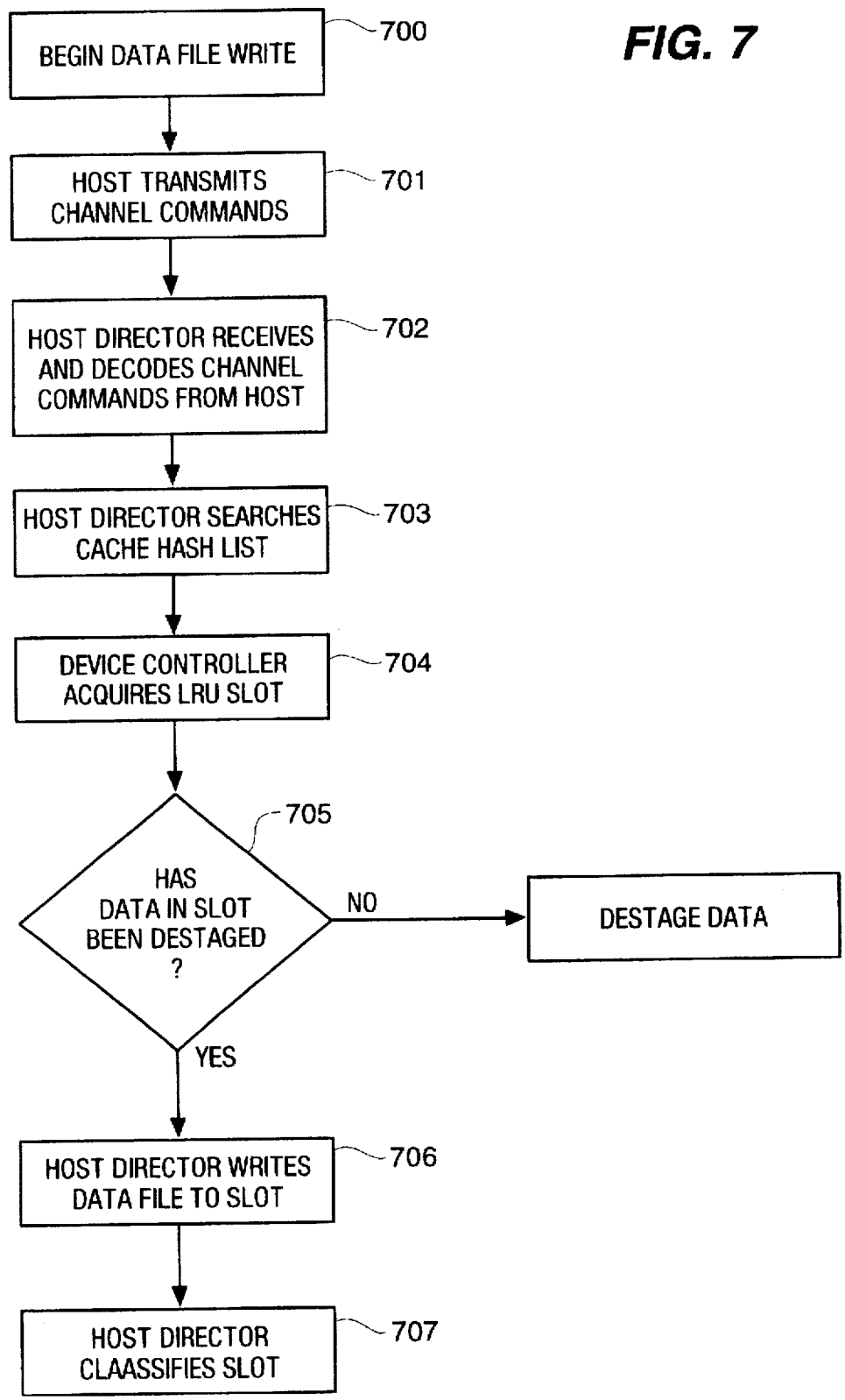

FIG. 7 illustrates in flow diagram form the operation of the preferred embodiment of the invention illustrated in FIG. 1 for a data file write operation activated at step 700, also termed a data file destage operation. The operation is initiated at step 701 where the host processor 111 transmits a series of channel commands, via an available data channel 131, to the data storage subsystem 1 to indicate that the host processor 111 requests that an identified data file be stored on an identified virtual device which is part of the backend data storage devices 121–124 of the data storage subsystem 1. The host director 151 of the data storage subsystem 1 receives at step 702 and decodes the received channel commands and data file. At step 703 the host director 151 searches the cache memory hash list index to ascertain whether a slot is available in cache memory 11. The host director 151 manages the received data file by locating an available slot of cache memory 11 by reading the LRU entry from the cache directory to identify the next available slot at step 704. If the data presently stored in the identified LRU slot, as determined at step 705, has yet to be written to backend data storage device 121, the data file stored in this slot must be processed independent of the host director 151 locating another available slot. This is accomplished by reclassifying the selected slot to the DESTAGE local list. Simultaneously, when the LRU slot selected for reallocation is found to contain data that has yet to be destaged to the backend storage devices, the slot is migrated to the OFFLIST global list while it is scheduled for destaging to the backend data storage device 122. The host director 151 retrieves another slot from the LRU position at step 704, and this slot is allocated to the data file stage operation. The host director 151 writes the identified requested data file to this slot from the host processor 111 at step 706. The slot is assigned at step 707 to a list, such as the USAGE global and local lists until the data contained therein is aged to the point where the slot becomes a LRU slot, or is initially assigned by the host to another list, or is reassigned by the cache control to one of the other cache local list types: CFW, DFW, PINNED, SSD.

Slot Migration Among List Types

Figure 4:
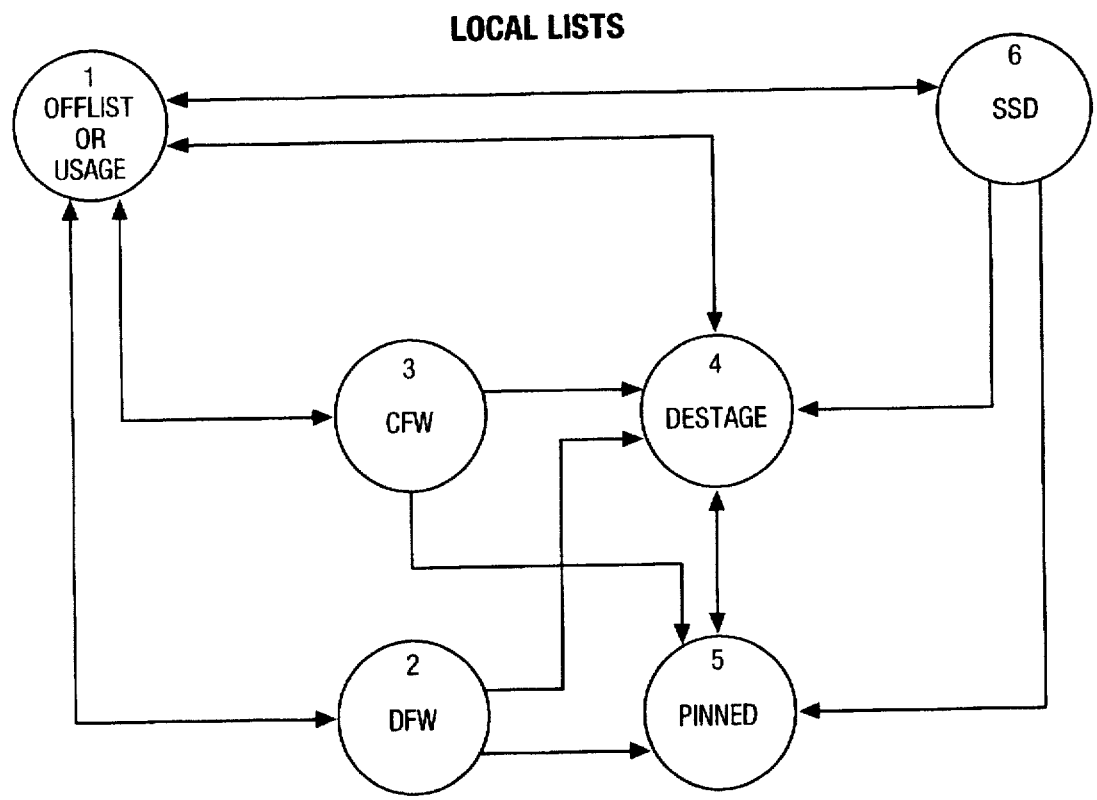
FIG. 4 illustrates in logic diagram form an illustrative set of local lists and the migration paths of data files therein.
Figure 5:
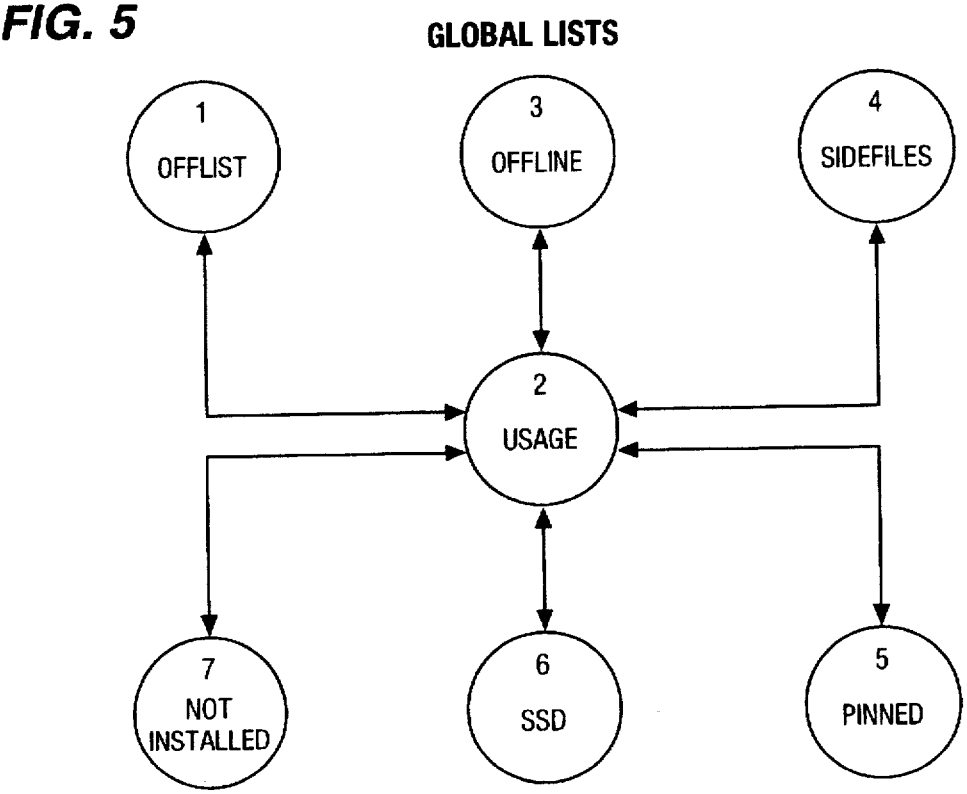
FIG. 5 illustrates the global lists migration paths.

FIG. 4 illustrates in logic diagram form an illustrative set of local lists and the migration paths of data files therein. FIG. 5 illustrates the global lists and the migration paths. For example, during the reallocation process, if the global LRU slot is found to contain data that has yet to be destaged to the backend storage devices, the slot is migrated to the OFFLIST global list and to the DESTAGE local list, if it is not already there, where it is scheduled for destaging to the backend storage devices. Once the data contained in the slot is destaged, it is migrated to the OFFLIST local list and the LRU position of the USAGE global list. The CFW local list comprises slots to which a host processor has written cache fast write data, while the DFW list comprises slots to which a host processor has written DASD fast write data or cache buffered write data. These two lists represent subsets of active data, with specific recognition being given to the unique nature of the data management required for the data files written therein. The DESTAGE list is a linked list which contains slots which contain data written by one of the host processors for relocation to a selected data storage device. Most data files that are relocated to a backend data storage device are migrated through this list. Thus, the entries on the CFW and DFW lists are migrated to the DESTAGE list for writing to the data storage devices. The data file migration process is triggered by the number of host writes and/or the length of time since the last host processor data file write. Similarly, if the host processor suspends or terminates the solid state disk operation, all slots in the SSD list are migrated to the DESTAGE list for writing to the selected data storage device. The PINNED list comprises slots which contain data files written by the host processor, which data files cannot be written to the designated storage device for some reason. Slots are migrated to this list from one of the DFW, CFW, SSD, DESTAGE lists and slots listed as PINNED can be migrated to other lists, once the problem is cleared.

Summary

As can be seen by this description, the global lists monitor certain characteristics of the slots while the local lists monitor other related characteristics of the slots. The change in data file status of the data contained in a slot is typically reflected by changes only in the local lists, while changes in the slot itself are reflected by changes in both the global and local lists.

We claim:

1. A data storage subsystem for storing a plurality of data files for at least one processor which is connected to said data storage subsystem, comprising:

n data storage devices, each of which stores a plurality of data files for said at least one processor, wherein n is an integer greater than 1; and a cache memory connected to said n data storage devices for storing a plurality of data files capable of being read from and written to said n data storage devices, said cache memory comprising:

a plurality of slots of predetermined size, for storing data files capable of being read from and written to a selected one of said n data storage devices, a plurality of global lists, which relate each of said plurality of slots to said cache memory in its entirety, and a plurality of local lists, substantially orthogonal to said global lists, which relate each of said plurality of slots to a one of said n data storage devices.

2. The data storage subsystem of claim 1 wherein each slot comprises a directory having stored therein a plurality of pointers, at least one for a selected one of said plurality of global lists and a selected one of said plurality of local lists in which said slot is listed.

3. The data storage subsystem of claim 1 further comprising:

m controllers, each of which is connected to said cache memory and at least one of said n data storage devices, for regulating the reading and writing of data, received from said cache memory, on said data storage devices connected thereto, wherein m is an integer greater than 1.

4. The data storage subsystem of claim 1 wherein each of said slots comprises:

slot directory data comprising forward and backward pointers of a linked list comprising a global list.

5. The data storage subsystem of claim 1 wherein each of said slots comprises: slot directory data comprising an identification of a one of said plurality of global lists on which said slot is listed.

6. The data storage subsystem of claim 1 wherein said slot is always identified on only one of said plurality of global lists.

7. The data storage subsystem of claim 1 wherein said plurality of global lists comprises:

a list which comprises data which identifies slots in order of time of access.

8. The data storage subsystem of claim 1 wherein said plurality of global lists comprises:

a list which comprises data which identifies slots having host modified data to be destaged to a one of said n virtual data storage devices.

9. The data storage subsystem of claim 1 wherein each of said slots comprises:

slot directory data comprising forward and backward pointers of a linked list comprising a local list.

10. The data storage subsystem of claim 1 wherein each of said slots comprises: slot directory data comprising an identification of a one of said plurality of local lists on which said slot is listed.

11. The data storage subsystem of claim 1 wherein said slot is always identified on only one of said plurality of local lists.

12. The data storage subsystem of claim 1 wherein said plurality of local lists comprises:

a list which comprises data which identifies slots in order of time of last access.

13. The data storage subsystem of claim 1 wherein said plurality of local lists is divided by device type.

14. The data storage subsystem of claim 1 wherein each of said slots is always identified on one global list and one local list.

15. The data storage subsystem of claim 1 wherein said plurality of local lists comprises:

a list which comprises data which identifies unmodified data, whose content is identical to corresponding data file data stored on a one of said n virtual data storage devices, said list being ordered in order of latest data file access, and maintained on a device basis.

16. The data storage subsystem of claim 1 wherein said plurality of local lists comprises:

a list which comprises data which identifies unmodified data, whose content is identical to corresponding data file data stored on a one of said n virtual data storage devices.

17. The data storage subsystem of claim 1 wherein slots can be migrated between ones of said plurality of local lists.

18. In a data storage subsystem for storing a plurality of data files for at least one processor which is connected to said data storage subsystem, which comprises n data storage devices, each of which stores a plurality of data files for said at least one processor, wherein n is an integer greater than 1 and a cache memory connected to said n data storage devices for storing a plurality of data files capable of being read from and written to said n data storage devices, a method of managing said cache memory comprising the steps of:

creating a plurality of slots of predetermined size, for storing data files capable of being read from and written to a selected one of said n data storage devices, maintaining a plurality of global lists, which relate each of said plurality of slots to said cache memory in its entirety, maintaining a plurality of local lists, which relate each of said plurality of slots to a one of said n data storage devices which relate to said cache memory in its entirety.

19. The method of claim 18 further comprising the step of:

maintaining, in each slot, a directory having stored therein a plurality of pointers, at least one for each list of said plurality of global lists and said plurality of local lists in which said slot is listed.

20. The method of claim 18 further comprising the step of:

maintaining slot directory data comprising forward and backward pointers of a linked list comprising a global list.

21. The method of claim 18 wherein said slot is listed on only one of said plurality of global lists, said method further comprises the step of:

storing an identification of a one of said plurality of global lists on which said slot is listed.

22. The method of claim 18 further comprising the step of:

maintaining slot directory data comprising forward and backward pointers of a linked list comprising a local list.

23. The method of claim 18 wherein said slot is listed on only one of said plurality of local lists, said method further comprises the step of:

storing an identification of a one of said plurality of local lists on which said slot is listed.

* * * * *